Sept. 15, 1953 V. C. WILSON 2,652,501

BINARY MAGNETIC SYSTEM

Original Filed July 27, 1951 2 Sheets-Sheet 1

Inventor:
Volney C. Wilson,
by Merton D. Moore
His Attorney.

Sept. 15, 1953 V. C. WILSON 2,652,501

BINARY MAGNETIC SYSTEM

Original Filed July 27, 1951 2 Sheets-Sheet 2

Inventor:
Volney C. Wilson,
by Merton D. Moore
His Attorney.

Patented Sept. 15, 1953 2,652,501

UNITED STATES PATENT OFFICE 2,652,501

BINARY MAGNETIC SYSTEM

Volney C. Wilson, Schenectady, N. Y., assignor to General Electric Company, a corporation of New York Continuation of application Serial No. 238,983, July 27, 1951. This application August 8, 1952, Serial No. 303,275

15 Claims. (Cl. 307—88)

Figure 1:
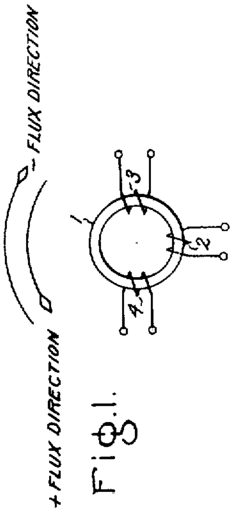

My invention relates in general to magnetic systems capable of representing binary information by the residual magnetism states of magnetic elements therein, and in particular to such systems of the type embracing scaling or counting systems and shifting registers.

This application is a continuation of my copending application entitled "Magnetic Scaling Circuit," Serial No. 238,983, filed July 27, 1951, now abandoned, and assigned to the same assignee as the present application.

In obtaining binary representation in scaling or counting devices, or for digital computing devices, two-position relays were originally employed to represent by one position or the other respective ones of two binary numbers. With the advance of the counting and computing art, and of the electronic art, two-position relays have been generally replaced by fast-acting and easily-switched electronic triggered circuits, e. g., circuits commonly referred to as flip-flop circuits. These triggered circuits, in general, contain two amplifying vacuum discharge devices regeneratively interconnected through resistors and capacitors so that either one device or the other is always conducting, the remaining device being biased to current cutoff. The two stable conduction states of these circuits, therefore, represent two binary numbers, and relatively low amplitude, short duration voltage pulses applied to these circuits serve to switch them from one conduction state to the other, i. e., from one binary number representation to the other. Although the use of triggered electronic circuits for the representation and manipulation of binary numbers affords many definite advantages, a number of disadvantages are encountered, such as vacuum discharge tube failures with resulting inconvenient replacements, the necessity for electric power supplies and the necessary removal of power dissipated as heat, and the loss of all represented binary information in the event of a power failure.

To eliminate the foregoing disadvantages in certain applications, magnetic systems have been developed which employ a series of magnetic cores made of a material possessing high retentivity and preferably having hysteresis characteristics essentially rectangular in shape, i. e., having residual flux densities which are relatively large percentages of the original flux densities present under magnetomotive forces. These magnetic cores may be equipped with electrical windings thereon which, in response to voltage pulse signals applied thereto, may cause the magnetic cores to be momentarily saturated and thus caused to reside in a static residual magnetism state in one flux direction or the other, each representative of one binary number or the other. Each of the cores is therefore a binary element and may form a part of a larger binary system which scales, holds, or manipulates information by virtue of the two-condition property. To change the residual flux direction, and thus the binary number represented by any core, it is only necessary to supply a short surge of magnetomotive force in the sense opposite to the original flux direction by means of an electrical pulse applied to one of the windings around the core. When the static flux direction in one of these cores is changed, a voltage induced in another winding thereon connected to a winding on a second core may cause a magnetomotive force in the second core to change the static flux direction in the second core. However, when a magnetomotive force surge is applied to one of these cores in the same direction as the original static flux direction, very little change in flux within the core takes place and therefore no transfer to other cores takes place.

Because of the fact that binary information can be represented by the flux direction of residual magnetism in magnetic cores and transferred from one core to another, it is possible to construct magnetic systems employing a plurality of these binary magnetic cores which form scaling or counting systems and shifting registers. The prior forms of such binary magnetic systems, however, are somewhat limited in that a great number of magnetic cores and windings thereon are required, and that two actuating signals, applied sequentially through different circuits are necessary to effect the transfer of binary information. Thus, in one form of previously known magnetic shifting registers, two magnetic cores are required for each binary digit place, and two sequential actuating pulses, each applied to a different circuit, are required to effect the shifting of binary information by one digit place.

Accordingly, it is an object of my invention to provide a new and improved system of binary magnetic elements.

It is a further object of my invention to provide such a system which requires fewer magnetic cores and windings.

It is a further object of my invention to provide such a system which may be actuated by a single electrical signal applied to a single actuation circuit.

It is a still further object of my invention to provide an embodiment of such a binary magnetic system which forms a new and improved scaling or counting system.

And it is a still further object of my invention to provide an embodiment of such a binary magnetic system which forms a new and improved shifting register.

Briefly stated, the binary magnetic system of my invention in one form thereof comprises a plurality of magnetic cores which are made of a magnetic material having relatively great retentivity, preferably having residual flux densities which are relatively great percentages of the original flux densities produced by magnetomotive forces. Three electrical windings—an actuation winding, an input winding, and an output winding—are provided around each of the magnetic cores. All of the actuation windings are connected to receive simultaneously actuating electrical pulse signals which cause magnetomotive forces in all of the cores driving the magnetic state of the cores momentarily to approximately saturation in a predetermined one of two possible flux directions. Immediately after such a pulse signal, therefore, all of the cores possess considerable residual flux density oriented in the predetermined flux direction. The cores are also connected in cascade relation from the output winding of one to the input winding of another through time delay circuits and unidirectional impedance means. When an actuating pulse signal is applied to all of the actuation windings, those cores which are originally residing in the static or residual magnetism state in the predetermined flux direction have negligible voltage induced in the output windings thereof and no effect is produced on the magnetic condition of the respectively succeeding cores whose input windings are connected to these output windings. However, those cores which are originally residing in the residual magnetism state near saturation in the opposite flux direction when the actuating pulse signal occurs have the residual flux therein switched rapidly from the opposite to the predetermined flux direction, and a relatively large voltage pulse is induced in the output windings of these cores, which is transmitted, after a time delay by the delay circuits, to the input windings connected thereto. The winding directions and polarity of the input and output winding connections are so chosen that this transmitted and delayed pulse signal received by the input windings causes a reversal of the residual flux direction in the cores of these input windings from the predetermined to the opposite flux direction. The unidirectional impedance means serve to prevent any signal from being transmitted from an output winding to an input winding which would cause a residual flux direction change from the opposite direction to the predetermined direction, and to prevent any signal from being transmitted backwards from an input winding to an output winding. Thus, in response to one actuating voltage pulse signal, a magnetic state or residual flux direction and, therefore, the binary number represented thereby, is shifted from one magnetic core to another.

Figure 2:
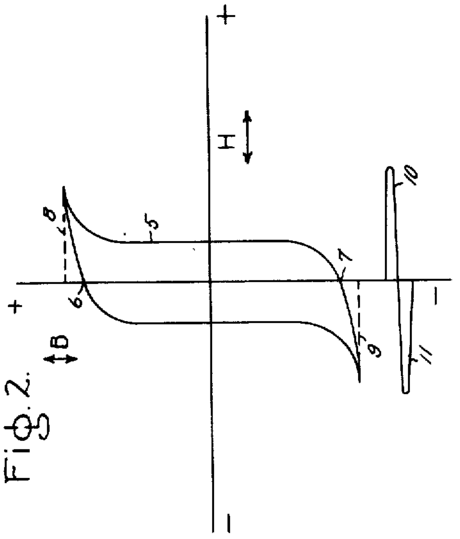
Figure 3:
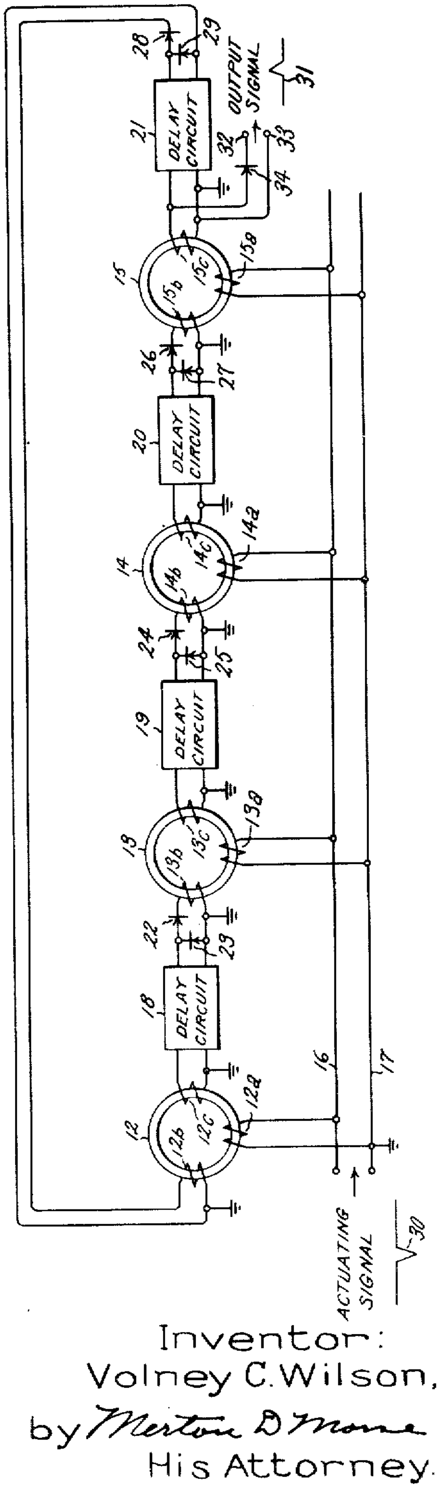
Figure 4:
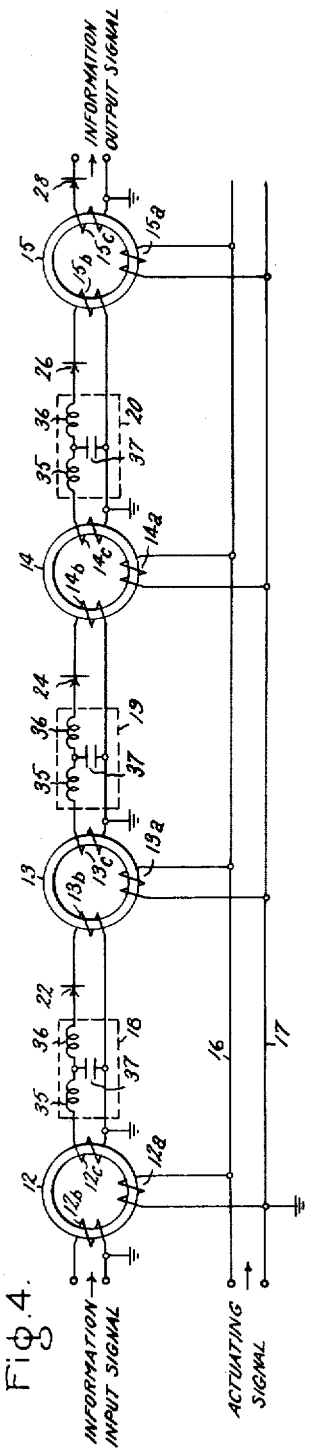
Figure 5:
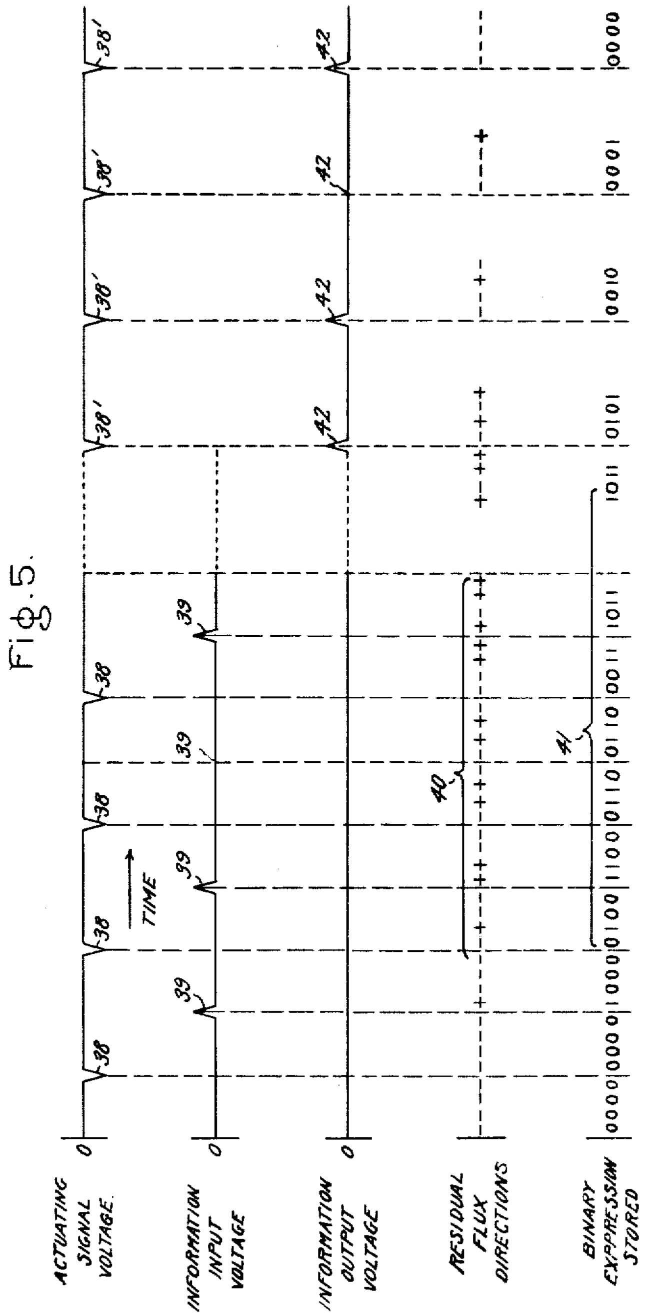

The novel features of my invention are pointed out with particularity in the appended claims. However, for a better understanding of the invention, together with further objects and advantages thereof, reference should be had to the following description taken in conjunction with the accompanying drawings, wherein:

Fig. 1 is an illustration of a magnetic core and associated electrical windings thereon, such as may be employed in carrying out my invention; Fig. 2 is a curve illustrating a preferred hysteresis characteristic for the material of the core shown in Fig. 1; Fig. 3 is an illustration of magnetic scaling system comprising a first embodiment of the binary magnetic system of my invention; and Fig. 4 is an illustration of a magnetic shifting register comprising a second embodiment of the binary magnetic system of my invention; and Fig. 5 is a series of curves drawn to a common time scale, illustrating the manner in which number information and actuating signals are applied and shifted through the shifting register of Fig. 4.

Referring now to Fig. 1, there is shown a magnetic core 1 which may be a closed rectangle in form, but which in the preferred embodiment illustrated is in the form of a closed ring or toroid. Core 1 is provided with a first or actuation winding 2, a second or output winding 3, and a third or input winding 4, thereraround. The magnetic material for core 1 is a material having relatively great magnetic retentivity and preferably a material having a hysteresis characteristic generally rectangular in shape, such as that illustrated by a curve 5 in Fig. 2 for which the abscissae are measured in units of magnetic field intensity, H, and the ordinates measured in magnetic flux density, B. Materials having hysteresis characteristics similar to that illustrated by curve 5 are known to those skilled in the art, such materials in general being nickel-iron alloys which have been subjected to special processes of heat and magnetic treatment, for example. A particularly desirable core material is ferrite, which has been especially processed to have generally rectangular hysteresis characteristics, it being well known that ferrite also possesses high electrical resistivity and low eddy current loss properties.

As seen from curve 5 in Fig. 2, magnetic core 1 may have, after it has been initially subjected to a magnetomotive force, only two static residual magnetism flux directions in the absence of an applied magnetomotive force. Because of the two possible residual flux directions, the magnetic core 1 is properly termed a binary element and, by its residual flux direction, may represent either of two binary numbers. These residual flux directions are indicated at points 6 and 7 on curve 5, which denote residual flux in a positive direction and an opposite or negative direction, respectively, within core 1. The hysteresis characteristic 5 is preferably essentially rectangular in shape, as shown, the positive and negative residual flux densities at points 6 and 7 being relatively great percentages of the positive and negative saturation flux densities at ordinates 8 and 9 respectively. A positive surge of magnetomotive force, such as pulse 10, caused by a current pulse applied to any of windings 2, 3, or 4, momentarily drives the flux within core 1 to saturation at ordinate 8, thereafter leaving the residual flux in a positive flux direction at point 6 on curve 5. Another positive surge of magnetomotive force applied to the core 1 then causes the flux density within the core to traverse curve 5 from the ordinates of points 6 to 8 and back to point 6, involving very little flux change and inducing negligible voltage in the other windings on the core. However, a negative surge of magnetomotive force, such as a pulse 11 caused by a current pulse applied to any of windings 2, 3, or 4, drives the flux within core 1 from the ordinate of point 6 to saturation at point 9 and leaves the residual flux in a negative flux direction at point 7. Thus, a magnetomotive force pulse applied in the opposite direction to the original residual flux direction causes a large flux change within the core, causes a large voltage pulse to be induced in the windings on the core, and reverses the direction of the residual flux. A magnetomotive force pulse applied in the same direction as the original residual flux direction, for practical purposes, produces no effect on the residual flux and causes little voltage to be induced in the windings on the core.

Arbitrarily defining a predetermined, in this case negative, flux direction and the opposite positive flux direction within core 1 to be as shown by the arrows in Fig. 1, and turning now to Fig. 3, a first embodiment of the binary magnetic system of my invention comprises a plurality of magnetic cores 12—15, which may be similar to core 1, connected by electrical windings to form a scaling system. The cores 12—15 are provided with actuation windings 12*a*—15*a*, input windings 12*b*—15*b*, and output windings 12*c*—15*c*, respectively. The actuation windings 12*a*—15*a* may be connected serially to a source of electrical pulse signals to be scaled to receive simultaneously actuating signals; however, in the illustrated preferred arrangement, actuation windings 12*a*—15*a* are connected in parallel to a source of actuating signals represented by pulsing buses 16 and 17. The direction of actuation windings 12*a*—15*a* and the polarity of the actuating signals applied thereto are so chosen as to drive flux within cores 12—15 in a predetermined direction; in the illustrated scaling system, bus 16 is pulsed negatively with respect to bus 17 and, as a result, flux is driven in a negative direction, as illustrated in Fig. 1, within the cores 12—15. Electrical connections are made between each of the output windings 12*c*, 13*c*, 14*c*, and 15*c* to the succeeding input windings 13*b*, 14*b*, 15*b*, and 12*b* respectively, such connections including a plurality of delay circuits 18—21 and a plurality of unidirectional impedances or rectifiers 22—29, as shown, which serve to interconnect the cores 12—15 in closed cascade relation.

Delay circuits 18—21 may be of any well-known type as long as their function of interposing a short time delay between a voltage signal induced in the output windings 12*c*—15*c* and a signal transmitted as a result of such an induced voltage to the input windings 12*b*—15*b*. For example, delay circuits 18—21 may be selected lengths of transmission line which yield an output signal delayed a predetermined period of time from an input signal, or they may be networks of lumped reactance elements which performs the same function.

The winding directions and the polarity of connections made between output windings and input windings are chosen such that a negative change in flux within the core of an output winding causes a voltage to be induced in that output winding which, after delay by the delay circuit, produces a surge of positive magnetomotive force in the cores of the input winding connected thereto by virtue of a current pulse flowing through the input winding.

Each pair of rectifiers is connected one in series with an input winding and the other in shunt relation to the input winding-rectifier series combination, e. g., rectifier 22 is connected in series with input winding 13*b* and rectifier 23 is connected in shunt relation across winding 13*b* and rectifier 22. Each pair of rectifiers, i. e., rectifiers 22 and 23, 24 and 25, etc., are properly poled to serve as means to allow only positive changes in flux within the core of an input winding to result from flux changes in the core of the output winding connected to the input winding; and to prevent flux changes in the core of an input winding from producing flux changes in the core of the output winding connected to the input winding.

In the following description of the binary magnetic scaling system of Fig. 3, consider that all the voltage polarities be taken with respect to the points illustrated as grounded and assumed to be at zero potential. Let it also be assumed that core 12 is initially residing in a positive flux direction of residual magnetism, such as illustrated by point 6 in Fig. 2, while the remaining cores 13—15 are residing in a negative flux direction of residual magnetism, such as illustrated by point 7 in Fig. 2. An actuating signal such as a negative voltage pulse 30 is supplied to pulsing buses 16 and 17 which simultaneously sends a current pulse through actuation coils 12*a*—15*a*, creating a negative surge of magnetomotive force, such as pulse 11, within all of the cores 12—15. The flux density within cores 13, 14, and 15 thus traverses curve 5 from the ordinates of point 7 to point 9, and back to point 7 causing very little voltage to be induced in the other windings of these cores. The flux density within core 12, however, traverses curve 5 from point 6 to point 9 to point 7, causing a large negative-going flux change within core 12 and inducing a large positive voltage pulse in winding 12*c*, which is applied to delay circuit 18. The delay period of delay circuits 18—21 should be at least as long as the duration of the actuating pulse 30 so that, after the actuating pulse 30 is over, the voltage pulse supplied to delay circuit 18 is transmitted through rectifier 22 to input winding 13*b* and causes a current pulse to flow therein, which produces a positive surge of magnetomotive force, such as pulse 10, in core 13, which causes the flux density within core 13 to traverse curve 5 from point 7 to point 8 to point 6. This positive change of flux within core 13 induces a negative voltage pulse in winding 13*c*, but this negative voltage pulse has no effect on the residual magnetism of core 14, since rectifier 24 prevents the flow of current into input winding 14*b* due to a negative voltage pulse. Further, when the positive voltage pulse was induced in output winding 12*c*, a negative voltage pulse was also induced in input winding 12*b*. However, this voltage induced in winding 12*b* has no effect on the residual magnetism of core 14, since it is shorted out by rectifiers 28 and 29. Therefore, it is seen that in response to the actuating pulse 30, the positive residual flux direction originally possessed by core 12 is shifted to the succeeding core, core 13. No other effects are produced because of the action of the rectifiers 22—29, and only one actuating pulse is required to shift the positive residual flux direction from one core to the next.

It will now be seen that a second actuating pulse 30 causes the positive residual flux direction to be shifted from core 13 to core 14; a third actuating pulse, from core 14 to 15; and a fourth actuating pulse, from core 15 back to core 12. However, when the fourth actuating pulse occurs, a positive output voltage pulse 31 appears across output terminals 32 and 33 connected through a rectifier 34 to output winding 15*c*. Thus, the binary system shown and described in conjunction with Fig. 3 serves as a scale-of-four scaling system, yielding one output pulse signal for every four actuating signals applied thereto. The present scaling system requires the same number of magnetic cores as the desired scaling ratio, and it will be readily understood that any number of such magnetic cores may be employed to obtain any desired scaling ratio in accordance with my invention.

Turning now to Figs. 4 and 5, I have shown a second embodiment of my invention which constitutes a binary magnetic shifting register. The shifting register of Fig. 4 is generally similar in construction to the scaling system of Fig. 3, having a plurality of magnetic cores 12—15, provided with actuation windings 12*a*—15*a*, input windings 12*b*—15*b*, and output windings 12*c*—15*c*. Input and output windings 12*b*—15*b* and 12*c*—15*c* are connected in cascade order to form a four-digit place shifting register, although it will be understood that any number of digit places may be provided by employing a like number of magnetic cores. The output windings 12*c*, 13*c* and 14*c* are connected through delay circuits 18—20 and rectifiers 22, 24, and 26, as shown. However, the input and output windings are not connected in closed cascade relation as in Fig. 3, and the delay circuit 21 of Fig. 3 is omitted. Further, it has been found possible to eliminate the use of shunt rectifiers 23, 25, 27 and 29, which are shown in Fig. 3, by choosing the number of turns for the output windings 12*c*—15*c* to be two to four times greater than the number of turns for the input windings 12*b*—15*b*, so that there is an advantageous impedance mismatch which prevents effective transmission of signals from an input winding backwards to the output winding connected to it. The delay circuits 18—20 in Fig. 4 are illustrated as one suitable form of lumped reactance network, it being understood that a distributed-constant transmission line may be used as an approximate equivalent of the T-configuration delay circuits 18—20, each of which includes two series-connected inductive elements 35 and 36, and a shunt-connected capacitor 37. The actuation coils 12*a*—15*a* are connected as previously described in conjunction with Fig. 3.

The purpose of a shifting register is to receive information in the form of binary expressions made up of a series of binary numbers and to shift the expressions through and out again, still intact after any length of storage. The shifting register may receive information supplied to it at a very slow rate and read it out some later time at a much faster rate, or vice versa. In considering the operation of the shifting register of Fig. 5, I arbitrarily designate that the two possible binary numbers are 1 and 0; that the presence of a positive voltage pulse in an electrical information signal denotes a binary 1, and its absence a binary 0; and that a positive or negative residual flux direction within a magnetic core indicates that the core represents a binary 1 or 0 respectively.

Assume, for example, that all of the magnetic cores in the shifting register of Fig. 4 are initially representing binary 0's, i. e., are in the negative residual flux direction state as illustrated by point 7 on curve 5, and that it is desired to shift the binary expression 1011 into the register. A series of four actuation or shifting voltage pulses 38 are each simultaneously applied to the actuation windings 12*a*—15*a* over buses 16 and 17, so as to drive the flux direction within cores 12—15 negative. Interspaced in time between the actuating pulses 38, a series of number information signals 39 are applied to input coil 12*b*, the presence of a positive voltage pulse indicating a binary 1 in the binary expression, and the absence of a pulse signal indicating a binary 0. In other words, the sequence of pulse, pulse, no pulse, pulse of signals 39 represents the binary expression 1011, read from right to left. After each actuating pulse 38 and each number signal 39, the directions of residual flux within cores 12—15 are given by algebraic signs in line 40 of Fig. 5; and similarly, the binary expressions represented by the cores 12—15 after each such pulse or signal are given by binary numbers in line 41 of Fig. 5.

It will be understood from Figs. 4 and 5 and the previous description given in connection with Fig. 3, that each actuating pulse 38 shifts the residual flux direction of one core to the next core in the shifting sequence, the binary number information being supplied to core 12 through winding 12*b* in between the successive actuating pulses. Thus, the residual flux within core 12 is driven to a positive direction through input winding 12*b* after the first, second, and fourth actuating pulses 38, each of the actuating pulses driving the residual flux in all of the cores 12—15 to a negative direction and, inducing in the output windings of those cores originally having residual flux in a positive flux direction, a positive voltage pulse which is delayed by a delay circuit until the actuating pulse is over and then transmitted to the input windings of the succeeding cores to produce a positive magnetomotive force and to drive the residual flux in those succeeding cores to a positive direction. A positive flux change produced within any one of the cores 12—15 by a positive voltage pulse applied to its input winding causes no effect on the residual flux condition of the succeeding core, since such a flux change induces a negative voltage in the output winding of the one core which cannot be transmitted by the rectifier in circuit therewith. Further, a negative flux change produced within any one of the cores 12—15 by a negative actuating voltage pulse applied to its actuation winding causes no effect on the residual flux condition of the preceding core, since such a flux change induces a negative voltage in the input winding of the one core which, due to the aforementioned impedance mismatch in the reverse direction, causes only a small current signal in the output winding of the preceding core that does not act to change appreciably the residual flux density condition of the preceding core.

After the number 1011 has been shifted into the shifting register, it may be stored there for any length of time (indicated by the time scale discontinuity in Fig. 5) and then shifted out again by four successive actuating pulses 38'. Thus, whenever core 15 represents a binary 1 by residual flux in a positive direction therein, a positive output voltage pulse is induced in output winding 15*c* in response to an actuating voltage pulse. The four shift-out actuating voltage pulses 38', therefore, shift the stored binary numbers to the right within the shifting register and a positive output voltage pulse 42 occurs each time that a binary 1 is shifted out of the register. The output pulse signals 42 forming the sequence pulse, pulse, no pulse, and pulse thus constitute the binary expression 1011 shifted out of the register through output winding 15c in the same voltage form and sequence as it was shifted into the register through input winding 12b.

From the foregoing, it is seen that the binary magnetic system of my invention provides the shifting of residual flux directions from one magnetic core to the next in response to a single actuating signal supplied by the single pulsing source illustrated as buses 16 and 17, and that a scaling system or a shifting register may be constructed in accordance with my invention to have the same number of magnetic cores as the desired scaling ratio or number of digit places respectively therein. The polarities of the signals, flux directions, and rectifier connections may be reversed from those given by way of illustration with full utilization of the principles and advantages of the invention. And while I have described my invention by reference to particular embodiments thereof, it will be understood that numerous modifications may be made by those skilled in the art without actually departing from the spirit of the invention. I, therefore, aim in the appended claims to cover all such equivalent variations as come within the true spirit and scope of the foregoing disclosure.

What I claim as new and desire to secure by Letters Patent of the United States is:

1. A magnetic system comprising a plurality of magnetic cores; a first, second, and third electrical winding on each of said cores; electrical circuit connections between the second winding on one of said cores and the third winding on another of said cores; said connections including means for transmitting an electrical signal from said second winding to said third winding only when the flux direction within the core of said second winding changes from a predetermined flux direction to the other flux direction in response to an actuating signal applied to said first windings; said transmitted signal causing magnetic flux within the core of said third winding to be oriented in said predetermined flux direction; said connections further including means for providing a time delay between said actuating signal and said transmitted signal, and means for preventing the transmission of electrical signals from said third windings to said second windings.

2. A magnetic system comprising a plurality of magnetic cores; a first, second, and third electrical winding on each of said cores; said first windings being connected to simultaneously receive electrical actuating signals; a plurality of delay circuits each connected between the second winding on one of said cores and the third winding on another of said cores; and unidirectional impedance means connected with each of said delay circuits and its associated second and third windings to allow voltages of only one predetermined polarity induced in the associated secondary winding to produce signal current in the associated third winding, and to prevent voltages induced in the associated third winding from producing signal current in the associated second winding.

3. A magnetic system comprising a plurality of magnetic cores having essentially rectangular hysteresis characteristics; an actuation winding, an input winding, and an output winding on each of said cores; said actuation windings being connected to receive simultaneously actuating electrical pulse signals which cause the residual flux within said cores to reside in an arbitrarily defined negative direction; a plurality of delay circuits each connecting the output winding of one of said cores to the input winding to another of said cores; and unidirectional impedance means connected with each of said delay circuits for allowing only positive changes in flux within the core of an input winding to result from flux changes within the core of the output winding connected to that input winding, and for preventing flux changes within the core of the input winding from producing flux changes within the core of the output winding; said input and output windings and said impedance means being poled to cause said positive changes in flux within the core of an input winding to result from negative flux changes within the core of the output winding connected to that input winding.

4. A magnetic scaling system comprising a plurality of magnetic cores having relatively high magnetic retentivity; a first, second, and third winding on each of said cores; said first windings being connected to simultaneously receive actuating electrical pulses which cause orientation of the residual magnetism within said cores in a predetermined flux direction; electrical connections between the second winding of each core and the third winding of a different core, connecting said second and third windings in closed cascade relation through said cores; each of said connections including a delay circuit, and unidirectional impedance means for permitting only current pulses causing orientation of the residual magnetism of any one of said cores in a flux direction opposite said predetermined direction to flow in the third winding of said one core in response to voltages induced in the second winding connected to that third winding as a result of residual flux changes from said opposite flux direction to said predetermined direction in the core of said connected second winding caused by said actuating pulses and to prevent electrical signal transfer from any of said third windings to any of said second windings.

5. A magnetic scaling system comprising a plurality of magnetic cores having generally rectangular hysteresis characteristics; an input winding, an output winding, and an actuation winding on each of said cores; said actuation windings being connected to receive simultaneously actuating electrical voltage pulses to be scaled; means connecting each of said input windings to the output windings of a different one of said cores from the core of that input winding, said input and output windings thereby being connected in closed cascade relation through said cores; each of said connecting means including a delay circuit, a first unidirectional impedance in series with said input windings, and a second unidirectional impedance in shunt relation with said first impedance and said input winding.

6. A magnetic shifting register comprising at least two magnetic cores; an actuation winding, and an output winding on each of said cores; said actuation windings being for connection to receive simultaneously actuating electrical pulse signals which cause the residual magnetism within said cores to have a predetermined flux direction; at least one delay circuit and one unidirectional impedance connecting the output winding of a first of said cores to the input winding of a second of said cores; said connected output and input windings and said unidirectional impedance being connected with polarities to allow only signal current causing orientation of the residual magnetism of said second core to have a direction opposite said predetermined flux direction to be transferred from said connected output winding in response to voltage induced in said connected output winding by a residual magnetism flux direction change resulting from said actuating signals; and said connected input winding having fewer turns than said connected output winding to provide an impedance mismatch therebetween which prevents effective current transfer from said connected input winding to said connected output winding due to voltages induced in said connected input winding.

7. A magnetic shifting register comprising a plurality of magnetic cores having generally rectangular hysteresis characteristics; a first, second, and third electrical winding on each of said cores; said first windings being connected to receive simultaneously actuating voltage pulses which cause residual magnetism in said cores in a predetermined flux direction; a plurality of delay circuits each connected between the output winding on a given one of said cores and the input winding on the core succeeding said one core in the shifting sequence; and unidirectional impedance means in series with said delay circuits for allowing electrical current transfer from said second windings to said third windings to cause residual magnetism in a direction opposite said predetermined flux direction in the cores of said third windings only in response to a magnetic flux direction change in the cores of the said second windings from said opposite to said predetermined flux direction caused by said actuating voltage pulses, and to prevent current transfer from said third windings to said second windings; whereby the residual magnetism flux direction of any one of said cores is shifted to the succeeding core in response to one of said actuating pulses.

8. A magnetic system comprising a plurality of magnetic cores, electrical windings on each of said cores, electrical circuit connections between one winding on one of said cores and a corresponding winding on another of said cores, said connections including means for transmitting an electrical signal from said one winding to said corresponding winding only when the flux direction within the core of said one winding changes in a predetermined direction, means for changing the flux direction within the core of said one winding, and means for introducing a time delay between the actuation of said last-named means and said transmitted signal.

9. A magnetic system comprising a plurality of magnetic cores, electrical windings on each of said cores, corresponding windings thereof being connected simultaneously to receive electrical actuating signals; delay circuits connected between the windings of adjacent cores, and unidirectional impedance means connected to each of said delay circuits to allow voltages of only one predetermined polarity induced in the winding of one core to produce signal current in the winding of the succeeding core, and to prevent voltages induced in the winding of the said succeeding core from producing signal current in the associated winding of the preceding core.

10. A magnetic scaling system comprising a plurality of magnetic cores having generally rectangular hysteresis characteristics, an input winding and an output winding on each of said cores, means for applying simultaneous actuating electrical voltage pulses to be scaled, means connecting each of said input windings to the output windings of a different one of said cores from the core of that input winding, said input and output windings thereby being connected in closed cascade relation through said cores, each of said connecting means including a delay circuit, a first unidirectional impedance in series with said input windings, and a second unidirectional impedance in shunt relation with said first impedance and said input winding.

11. A magnetic shifting register comprising at least two magnetic cores, an input winding and an output winding on each of said cores, means to apply simultaneously actuating electrical pulse signals to said cores to cause the residual magnetism within said cores to have a predetermined flux direction, at least one delay circuit and one unidirectional impedance connecting the output winding of a first of said cores to the input winding of a second of said cores, said connected output and input windings and said unidirectional impedance being connected with polarities to allow only signal current causing orientation of the residual magnetism of said second core to have a direction opposite said predetermined flux direction to be transferred from said connected output winding in response to voltage induced in said connected output winding by a residual magnetism flux direction change resulting from said actuating signals, said connected input winding having fewer turns than said connected output winding to provide an impedance mismatch therebetween, thereby to prevent effective current transfer from said connected input winding to said connected output winding due to voltages induced in said connected input winding.

12. A magnetic shifting register comprising a plurality of magnetic cores having generally rectangular hysteresis characteristics, input and output electrical windings on each of said cores, means to simultaneously establish residual magnetism in said cores in a predetermined flux direction, a plurality of delay circuits each connected between the output winding on a given one of said cores and the input winding on the core succeeding said one core in the shifting sequence, and unidirectional impedance means in series with said delay circuits for allowing electrical current transfer from said output windings to said input windings to cause residual magnetism in a direction opposite said predetermined flux direction in the cores of said input windings only in response to a magnetic flux direction change in the cores of the said output windings from said opposite to said predetermined flux direction, and to prevent energy transfer from said input windings to said output windings, whereby the residual magnetism flux direction of any one of said cores is shifted to the succeeding core.

13. In a binary magnetic system, the combination comprising a first magnetic circuit adapted to be maintained in a predetermined one of a pair of stable states of magnetization, means for shifting the magnetization of said first circuit to the other of said states, a second magnetic circuit also adapted to be maintained in a predetermined one of a pair of stable states of magnetization, said second circuit being selectively responsive to alterations of the magnetization of said first circuit to effect alterations of the magnetization of said second circuit, and means to delay the response of said second circuit to alterations in magnetization of said first circuit.

14. In a binary magnetic system, the combination comprising a first magnetic circuit adapted to be maintained in a predetermined one of a pair of stable states of magnetization, means for shifting the magnetization of said first circuit to the other of said states, a second magnetic circuit also adapted to be maintained in a predetermined one of a pair of stable states of magnetization, said second circuit being selectively responsive to alterations of the magnetization of said first circuit to effect alterations of the magnetization of said second circuit, means to delay the response of said second circuit to alterations in magnetization of said first circuit, and means effectively decoupling said first and second circuits for magnetic influences originating in said second circuit and directed toward said first circuit.

15. In a magnetic scaler, the combination comprising a first magnetic circuit magnetized in a predetermined sense, means for altering the magnetization of said first circuit, a second magnetized circuit adapted to be maintained in a predetermined state of magnetization and coupled to said first circuit, said second circuit being selectively responsive to alterations of the magnetization of said first circuit to alter the magnetization of said second circuit, means in the coupling between said first and second circuits to delay the response of said second circuit to alterations in magnetization of said first circuit, and means effectively decoupling said first and second circuits for magnetic influences originating in said second circuit and directed toward said first circuit.

VOLNEY C. WILSON.

No references cited.

Notice of Adverse Decision in Interference

In Interference No. 87,275 involving Patent No. 2,652,501, V. C. Wilson, Binary magnetic system, final judgment adverse to the patentee was rendered July 18, 1957, as to claims 1, 2, 3, 4, 6, 7, 8, 9, 11, 12, 13, 14, and 15.

[*Official Gazette August 27, 1957.*]